United States Patent
Nakamura et al.

(10) Patent No.: US 10,769,049 B2
(45) Date of Patent: Sep. 8, 2020

(54) DEBUGGING SUPPORT APPARATUS AND DEBUGGING SUPPORT METHOD

(71) Applicant: Mitsubishi Electric Corporation, Tokyo (JP)

(72) Inventors: Hiroyuki Nakamura, Tokyo (JP); Keisuke Nakajima, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/328,288

(22) PCT Filed: Oct. 17, 2016

(86) PCT No.: PCT/JP2016/080722
§ 371 (c)(1),
(2) Date: Feb. 26, 2019

(87) PCT Pub. No.: WO2018/073868
PCT Pub. Date: Apr. 26, 2018

(65) Prior Publication Data
US 2019/0340106 A1 Nov. 7, 2019

(51) Int. Cl.
*G06F 11/00* (2006.01)
*G06F 11/36* (2006.01)

(52) U.S. Cl.
CPC ...... *G06F 11/3648* (2013.01); *G06F 11/3664* (2013.01)

(58) Field of Classification Search
CPC .................. G06F 11/3648; G06F 11/3664
See application file for complete search history.

(56) References Cited

U.S. PATENT DOCUMENTS 5,872,909 A * 2/1999 Wilner ............... G06F 11/0715
714/38.12
2003/0070120 A1* 4/2003 Michael ............. G06F 11/3664
714/38.14
(Continued)

FOREIGN PATENT DOCUMENTS

JP 2001-255935 A 9/2001
JP 2001-312418 A 11/2001
(Continued)

OTHER PUBLICATIONS

Notification of Reasons for Refusal received for Japanese Patent Application No. 2017-560640, dated May 10, 2018, 6 pages including English Translation.
(Continued)

*Primary Examiner* — Philip Guyton
(74) *Attorney, Agent, or Firm* — Xsensus LLP

(57) ABSTRACT

A debugging support apparatus supports debugging of a sequence program executed by a control apparatus. The debugging support apparatus includes a recording unit and a graph display processing unit which is a presentation processing unit. The recording unit records step numbers which are order information indicating the execution order of arithmetic processing for components constituting the sequence program, and operation data handled in step-by-step arithmetic processing. The graph display processing unit presents a relationship between the order information and the operation data.

12 Claims, 10 Drawing Sheets

(56) References Cited

U.S. PATENT DOCUMENTS

| | | | |
|---|---|---|---|
| 2007/0168068 A1* | 7/2007 | Saito | G05B 19/042 |
| | | | 700/109 |
| 2009/0106741 A1* | 4/2009 | Dageville | G06F 11/3636 |
| | | | 717/128 |
| 2014/0058538 A1* | 2/2014 | Yaoita | G06F 11/3636 |
| | | | 700/28 |
| 2015/0301923 A1* | 10/2015 | Yamaoka | G05B 19/05 |
| | | | 714/38.1 |
| 2019/0018385 A1* | 1/2019 | Soneda | G05B 19/05 |
| 2019/0060213 A1* | 2/2019 | Revellame | A61K 8/73 |

FOREIGN PATENT DOCUMENTS

| | | |
|---|---|---|
| JP | 2003-248504 A | 9/2003 |
| JP | 2005-115426 A | 4/2005 |
| JP | 2017-079009 A | 4/2017 |
| WO | 2013/145105 A1 | 10/2013 |

OTHER PUBLICATIONS

Notification of Reasons for Refusal received for Japanese Patent Application No. 2017-560640, dated Dec. 28, 2017, 7 pages including English Translation.
Decision to Grant a Patent received for Japanese Patent Application No. 2017-560640, dated Sep. 21, 2018, 6 pages including English Translation.
International Search Report dated Dec. 20, 2016 for PCT/JP2016/080722 filed Oct. 17, 2016, 8 pages including English Translation.
Office Action issued in Chinese Application 201680090075.0 dated Jan. 20, 2020.

* cited by examiner

DEBUGGING SUPPORT APPARATUS AND DEBUGGING SUPPORT METHOD

CROSS-REFERENCE TO RELATED APPLICATIONS

The present application is based on PCT filing PCT/JP2016/080722, filed Oct. 17, 2016, the entire contents of which are incorporated herein by reference.

FIELD

The present invention relates to a debugging support apparatus and a debugging support method that support debugging of a sequence program executed by a control apparatus that controls industrial machinery.

BACKGROUND

A control apparatus in the Factory Automation (FA) field which achieves automation of a factory manufacturing process repeatedly performs arithmetic written in a sequence program. With a high degree of control in recent years, the sequence program has undergone a remarkable increase in size and in the complexity of arithmetic processing. Hence, there is a case in which during a single scan during which arithmetic for the first to last steps of the sequence program is performed, operation data to be temporarily stored in a work area which is a memory area used for execution of the sequence program is frequently changed.

Patent Literature 1 relates to a method for debugging a control program, and discloses that data of input devices and output devices, which are control targets, is sequentially recorded in association with an execution location of the control program, and history information including data for each step is collected.

CITATION LIST

Patent Literature

Patent Literature 1: Japanese Patent Application Laid-open No. 2003-248504

SUMMARY

Technical Problem

However, according to the above-described conventional art, because only data of input devices and output devices is recorded and there is no recording of data of devices that are not directly related to the input devices and the output devices. Accordingly, it requires time and trouble to identify a bug which is a cause of an abnormality in a sequence program, and it is difficult to achieve efficient debugging.

The present invention is made in view of the above description, and an object of the present invention is to obtain a debugging support apparatus that enables to achieve efficient debugging.

Solution to Problem

A debugging support apparatus according to an aspect of the present invention includes a recording unit and a presentation processing unit. The debugging support apparatus inspects a sequence program executed by a control apparatus. The recording unit records order information and operation data. The order information indicates execution order of arithmetic processing for components constituting the sequence program. The operation data is data handled in arithmetic processing of each step. The presentation processing unit presents a relationship between the order information and the operation data.

Advantageous Effects of Invention

The debugging support apparatus according to the present invention provides an advantageous effect of being able to achieve efficient debugging.

DESCRIPTION OF EMBODIMENTS

Debugging support apparatuses and debugging support methods according to embodiments of the present invention will be described in detail below based on the drawings. Note that the invention is not limited by the embodiments.

First Embodiment

Figure 1:
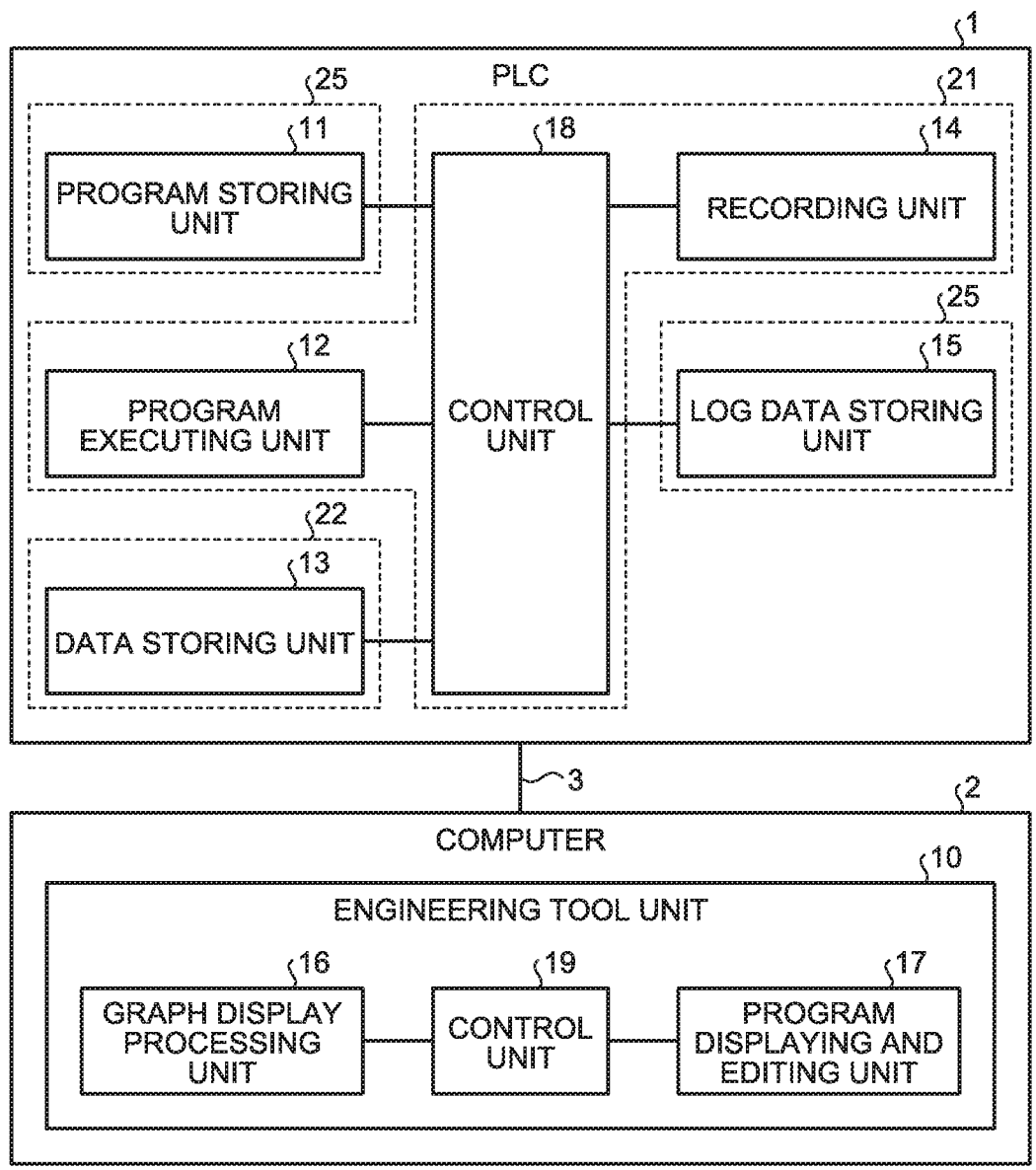
FIG. 1 is a diagram illustrating a basic configuration of a debugging support apparatus according to a first embodiment of the present invention.

FIG. 1 is a diagram illustrating a basic configuration of a debugging support apparatus according to a first embodiment of the present invention. The debugging support apparatus supports debugging of a sequence program by presenting data to be referred to upon identifying a bug in the sequence program.

The debugging support apparatus is configured to include a computer 2 having an engineering tool program installed thereon; and a Programmable Logic Controller (PLC) 1 which is a control apparatus. A network cable 3 communicably connects the PLC 1 to the computer 2.

The computer 2 generates project data including a sequence program which is executed by the PLC 1, and transmits the project data to the PLC 1. The PLC 1 controls the drive of machines which are control targets by executing the sequence program.

The PLC 1 of the present embodiment includes a program storing unit 11 which is a functional unit that stores the sequence program; and a program executing unit 12 which is a functional unit that executes the sequence program read from the program storing unit 11. In addition, the PLC 1 of the present embodiment includes a data storing unit 13 which is a functional unit that stores operation data handled in arithmetic processing performed by the sequence program; and a recording unit 14 which is a functional unit that records step numbers and operation data of each step, to generate log data. The step numbers are order information indicating the execution order of arithmetic processing for components constituting the sequence program. In addition, the PLC 1 of the present embodiment includes a log data storing unit 15 which is a functional unit that stores the log data generated by the recording unit 14. A control unit 18 is a functional unit that controls each unit of the PLC 1. Note that broken lines illustrated in the PLC 1 of FIG. 1 indicate a correspondence relationship between each functional unit and a hardware configuration illustrated in FIG. 2 which will be described later.

The computer 2 of the present embodiment includes an engineering tool unit 10. The engineering tool unit 10 is implemented by hardware of the computer 2 executing the engineering tool program.

The engineering tool unit 10 includes a graph display processing unit 16 which is a functional unit that displays, on a graph display screen, a graph representing a relationship between step numbers and operation data, based on the log data read from the log data storing unit 15. The graph display processing unit 16 which is a presentation processing unit presents a relationship between the order information and the operation data handled in arithmetic processing of each step.

In addition, the engineering tool unit 10 includes a program displaying and editing unit 17 which is a functional unit that generates project data including a sequence program. The program displaying and editing unit 17 performs a program code editing process according to a user's input operation, and displays the sequence program on an edit screen. In addition, the program displaying and editing unit 17 includes a monitoring function of monitoring operation data obtained when the PLC 1 executes the sequence program. A control unit 19 is a functional unit that controls each unit of the engineering tool unit 10.

Figure 2:
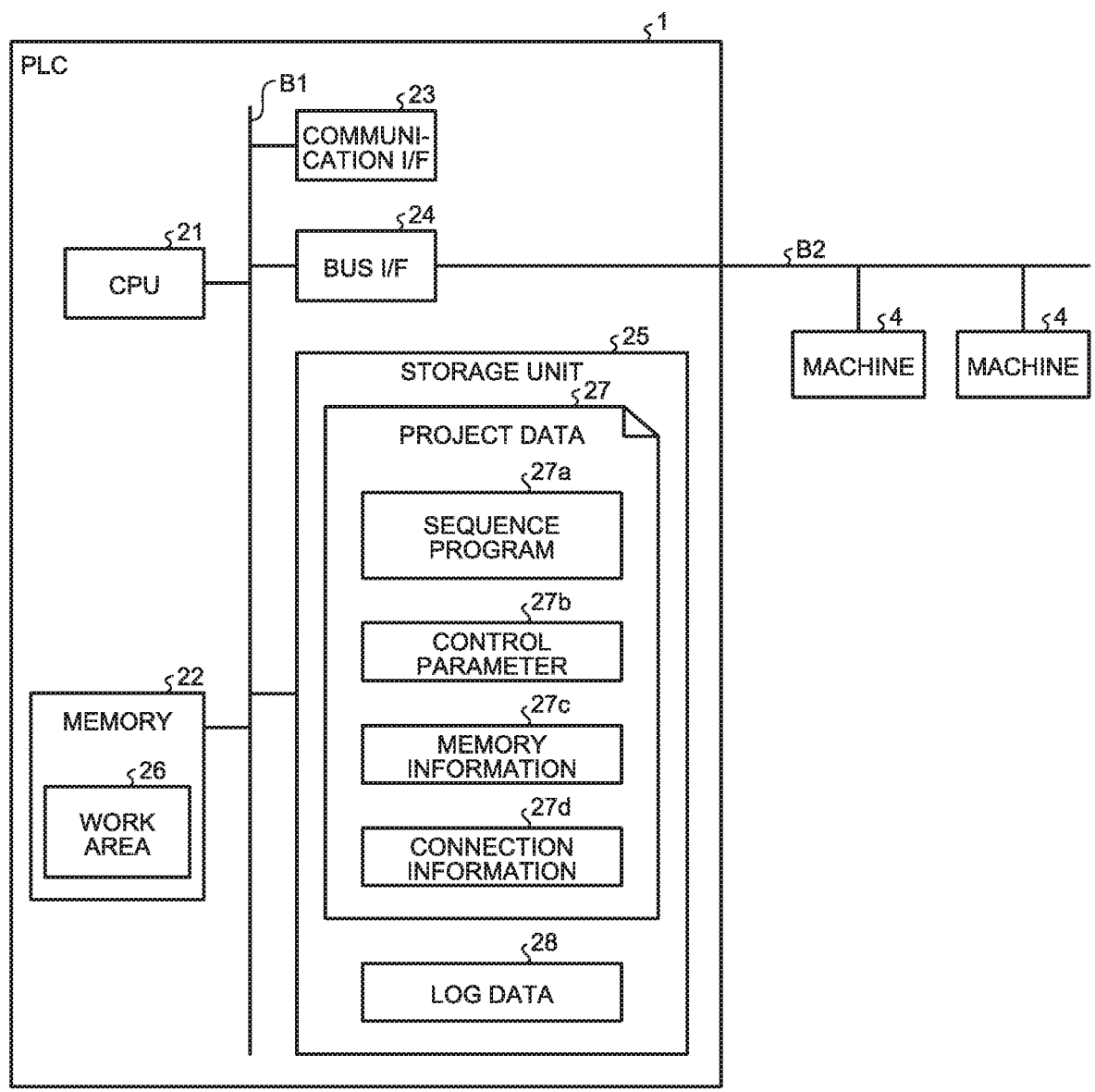
FIG. 2 is a diagram illustrating a hardware configuration of a PLC illustrated in FIG. 1.

FIG. 2 is a diagram illustrating a hardware configuration of the PLC 1. The PLC 1 includes a Central Processing Unit (CPU) 21, a memory 22, a communication interface 23, a bus interface 24, and a storage unit 25. The units of the PLC 1 are connected to each other via an internal bus B1.

The communication interface 23 is an interface for connection with the computer 2. The bus interface 24 is a bus bridge circuit that communicates between the internal bus B1 and an expansion bus B2. Machines 4 which are control targets are connected to the PLC 1 via the expansion bus B2. The machines 4 are manufacturing apparatuses, processing apparatuses, or facility apparatuses, and may be any apparatus used in an FA system.

The storage unit 25 which is an external storage apparatus stores project data 27 which is received from the computer 2, and log data 28. The storage unit 25 is a Solid State Drive (SSD) or a Hard Disk Drive (HDD). The project data 27 includes a sequence program 27a, a control parameter 27b, memory information 27c, and connection information 27d. The functions of the program storing unit 11 and the log data storing unit 15 are implemented by using the storage unit 25.

The control parameter 27b is a parameter to be referred to upon execution of the sequence program 27a. The memory information 27c is information that describes regulations for data areas for each operation data in a work area in the memory 22. The connection information 27d is information that defines a connection relationship between the PLC 1 and the machines 4.

In the first embodiment, the sequence program 27a is written in ladder language. The sequence program 27a may be written in structured ladder language or function block diagram language which is a language other than the ladder language.

The memory 22 is a Random Access Memory (RAM). The sequence program 27a is loaded into the memory 22. The CPU 21 decompresses the sequence program 27a in a program storage area in the memory 22 and performs various types of processes. The functions of the program executing unit 12, the recording unit 14, and the control unit 18 are implemented by using the CPU 21.

A data storage area in the memory 22 is a work area 26 used upon performing various types of processes. In the work area 26 there are allocated a plurality of data areas defined by the memory information 27c. Each data area stores operation data handled in arithmetic processing. The function of the data storing unit 13 is implemented by using the memory 22.

The CPU 21 reads each operation data from the work area 26 for every step of the sequence program 27a, and thereby generates log data 28. The CPU 21 writes the generated log data 28 into the storage unit 25. The log data 28 includes various operation data including data to be inputted to the machines 4, data to be outputted from the machines 4, and internal data of the machines 4.

Figure 3:
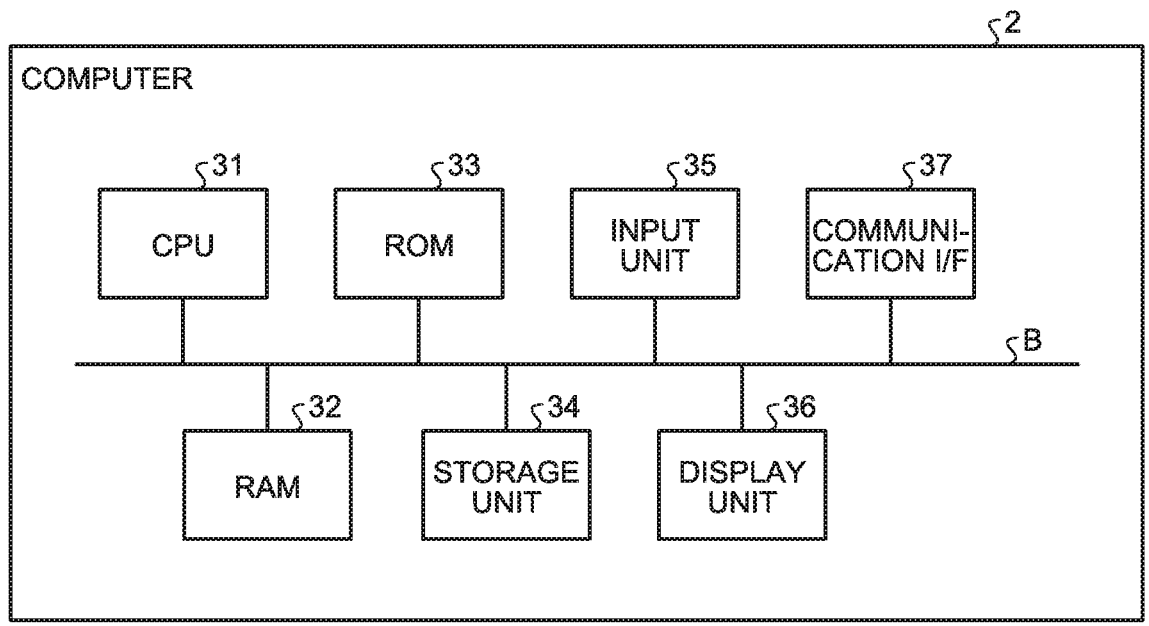
FIG. 3 is a diagram illustrating a hardware configuration of a computer illustrated in FIG. 1.

FIG. 3 is a diagram illustrating a hardware configuration of the computer 2. The computer 2 includes a CPU 31, a RAM 32, a Read Only Memory (ROM) 33, a storage unit 34, an input unit 35, a display unit 36, and a communication interface 37. The units of the computer 2 are connected to each other via a bus B.

The CPU 31 executes programs stored in the ROM 33 and the storage unit 34. The ROM 33 which is a nonvolatile memory stores Basic Input/Output System (BIOS) or Unified Extensible Firmware Interface (UEFI) which is a program. The storage unit 34 which is an external storage apparatus is an SSD or an HDD. The storage unit 34 stores an operating system program and an engineering tool program.

The programs stored in the ROM 33 and the storage unit 34 are loaded into the RAM 32. The CPU 31 decompresses the programs in a program storage area in the RAM 32 and performs various types of processes. A data storage area in the RAM 32 is a work area used upon performing various types of processes. The functions of the graph display processing unit 16, the program displaying and editing unit 17, and the control unit 19 are implemented by using the CPU 31.

The input unit 35 accepts user's input operations. The input unit 35 is a pointing device and a keyboard. The display unit 36 is a display that displays various types of screens. The communication interface 37 is an interface for connection with the PLC 1.

Figure 4:
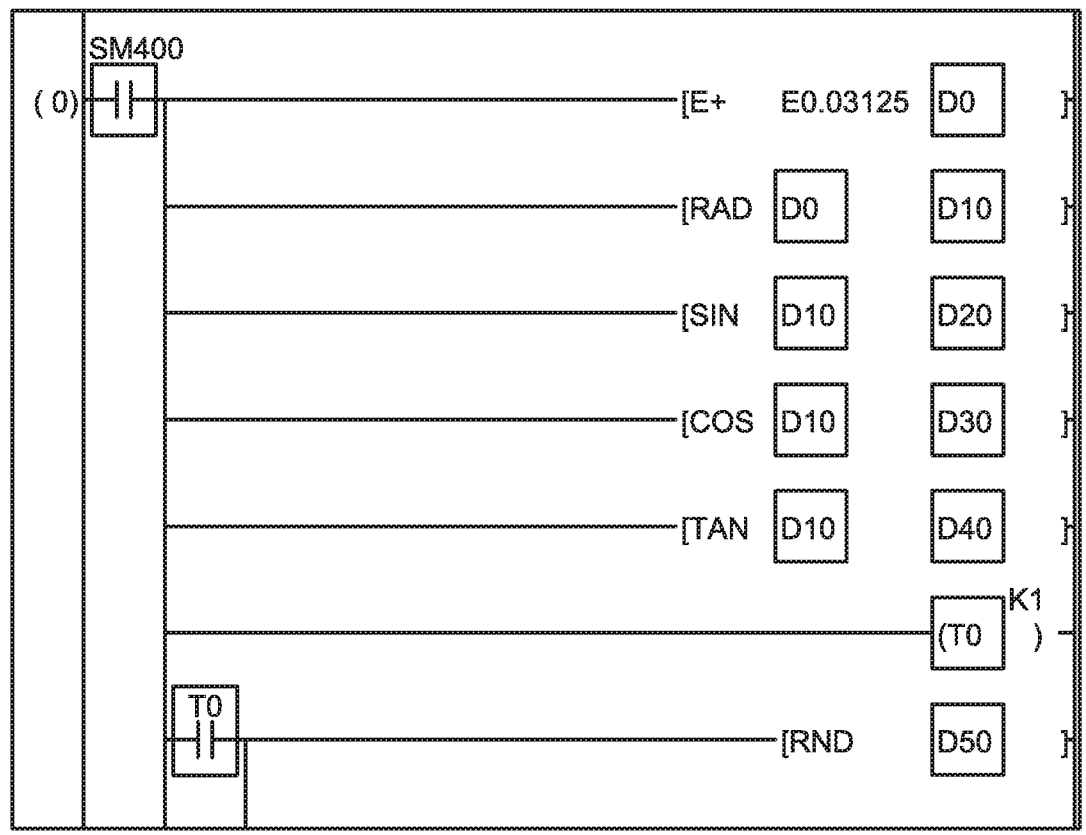
FIG. 4 is an illustrative diagram illustrating an example of a sequence program created by the computer illustrated in FIG. 1.

FIG. 4 is an illustrative diagram illustrating an example of a sequence program created by the computer 2. FIG. 4 illustrates a ladder program written in ladder language. The program displaying and editing unit 17 displays a part of the ladder program on an edit screen.

The ladder program includes a plurality of circuit blocks. Each circuit block is configured by a combination of a condition portion which is a group of circuits in which contacts are connected in series or parallel with each other, and an operating portion which is a group of circuit(s) in which one or more coils are connected in series. The operating portion indicates the content of a step which is arithmetic processing performed when the contacts of the condition portion are brought into conduction. The step is a component unit of the sequence program, and includes one or more instructions. A step number which is order information indicates the execution order of arithmetic processing for a component of the sequence program. One step number is assigned to one or a plurality of circuit blocks. FIG. 4 illustrates a circuit block with step number (0). Note that the order information is not limited to the step numbers and may be any information indicating the execution order of arithmetic processing.

Program code generated in ladder language includes circuit symbols and variables which are basic components. A circuit symbol includes a contact and a coil that indicate a process performed by the PLC 1, and a variable indicates a target for the process indicated by the circuit symbol. Each data area of the work area 26 stores operation data for each component. The operation data includes bit data representing a distinction between ON and OFF; and word data representing a numerical value.

In the ladder program, each component is written as a combination of an alphabet indicating the type of the component and a number indicating an address. In FIG. 4, "SM400", "D0", "D10", "D20", "D30", "D40", "D50", and "T0", each of which is illustrated by an enclosed rectangle, all indicate components.

Figure 5:
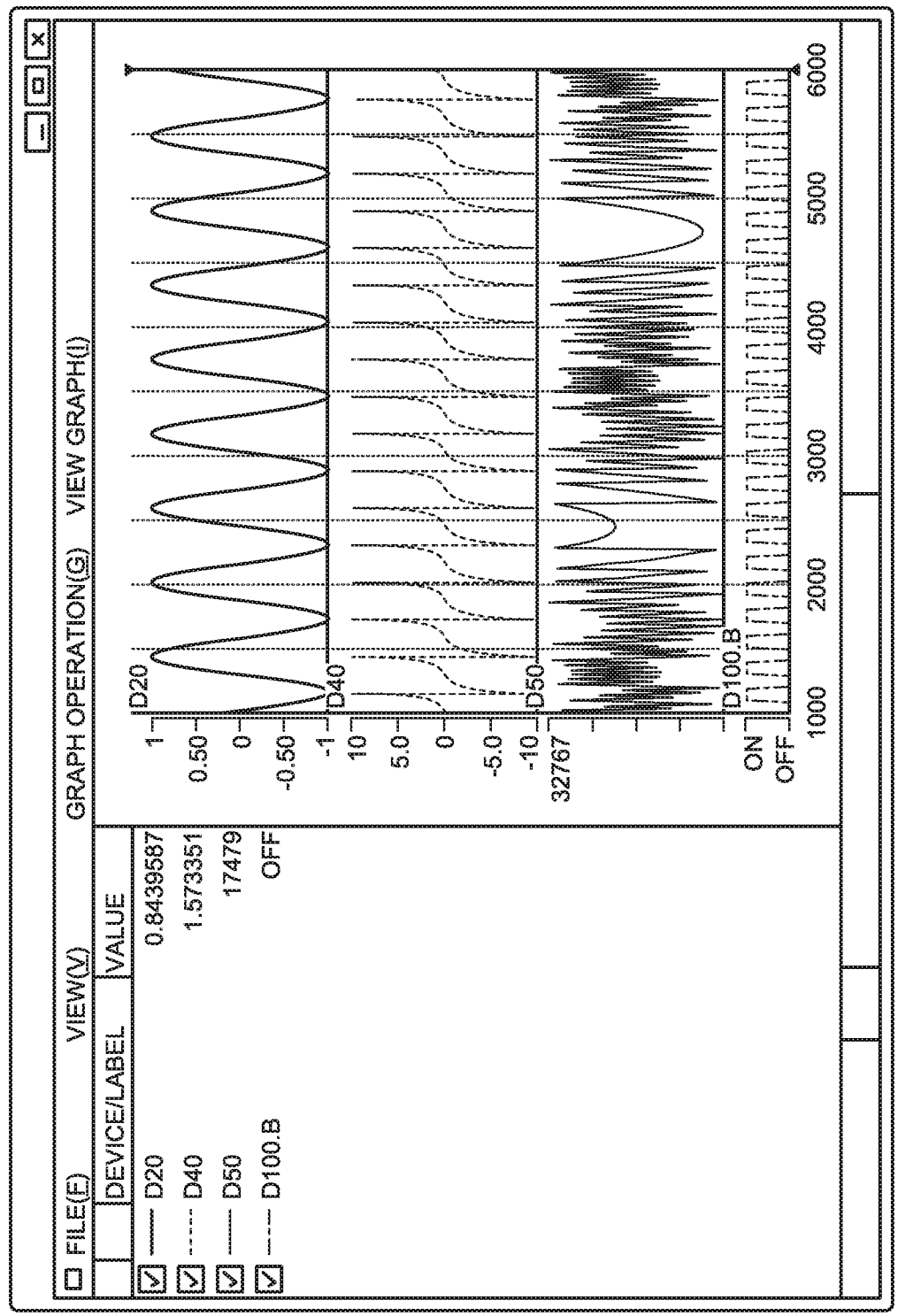
FIG. 5 is a diagram illustrating an example of a graph display screen of the computer illustrated in FIG. 1.

FIG. 5 is a diagram illustrating an example of a graph display screen of the computer 2. The graph display processing unit 16 reads, from the data storing unit 13, results of each operation data of each step recorded by the recording unit 14, and performs a process for graph display.

In a right-side region of the graph display screen illustrated in FIG. 5, graphs for each component of a ladder program are vertically arranged in a row. A vertical axis of each graph represents operation data, and a horizontal axis represents a step number. In a left-side region of the graph display screen, by placing a cursor on a graph, each operation data obtained at a point in time specified by the cursor is displayed.

The graph display screen illustrated in FIG. 5 displays graphs and operation data for the components "D20", "D40", "D50", and "D100.B". The graph display screen may display graphs and operation data by using different colors for each component. The range of step numbers represented on the horizontal axis of the graph may be arbitrarily changeable. Note that the graphs are not limited to line graphs exemplified in FIG. 5. The graphs may be any graph that can display a relationship between order information and operation data, and may be a bar graph or any other graph.

Figure 6:
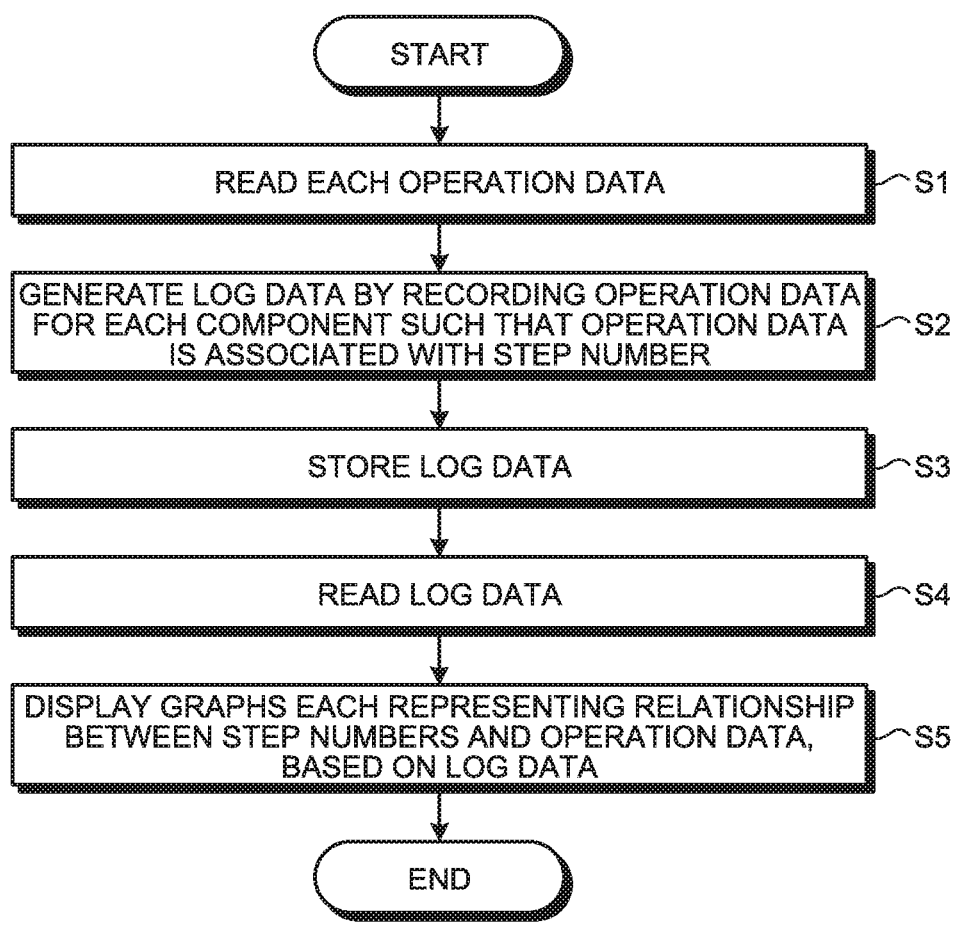
FIG. 6 is a flowchart illustrating a procedure of processes performed by the PLC and the computer for graph display on the graph display screen illustrated in FIG. 5.

FIG. 6 is a flowchart illustrating a procedure of processes performed by the PLC 1 and the computer 2 for graph display on the graph display screen illustrated in FIG. 5. A debugging support method according to the embodiment includes processes at step S1 to step S5. At step S1, the recording unit 14 of the PLC 1 reads each operation data in the data storing unit 13 for every step which takes place after starting the execution of the sequence program. At step S2 which is a recording step, the recording unit 14 records operation data for each component of the ladder program such that the operation data is associated with a step number, and thereby generates log data. At step S3, the log data storing unit 15 stores the log data generated by the recording unit 14.

As such, by recording operation data of each step, the PLC 1 continuously obtains operation data of each step in accordance with the execution of the sequence program. The PLC 1 may obtain operation data for all steps from the first to last steps of the sequence program, or may obtain operation data for some of all steps. The case of obtaining operation data for some of all steps includes a case in which operation data of each step at intervals of a certain number of steps is obtained and operation data for other steps is omitted and not obtained. The case of continuously obtaining operation data of each step includes a case of obtaining operation data for all steps and a case of obtaining operation data for some steps.

At step S4, the graph display processing unit 16 of the computer 2 reads the log data from the log data storing unit 15. At step S5 which is a presentation processing step, the graph display processing unit 16 displays graphs each representing a relationship between step numbers and operation data for each component, on a graph display screen, based on the read log data. With this processing, the graph display processing unit 16 presents a relationship between order information and operation data handled in arithmetic processing of each step, by graph display on the display unit 36.

Figure 7:
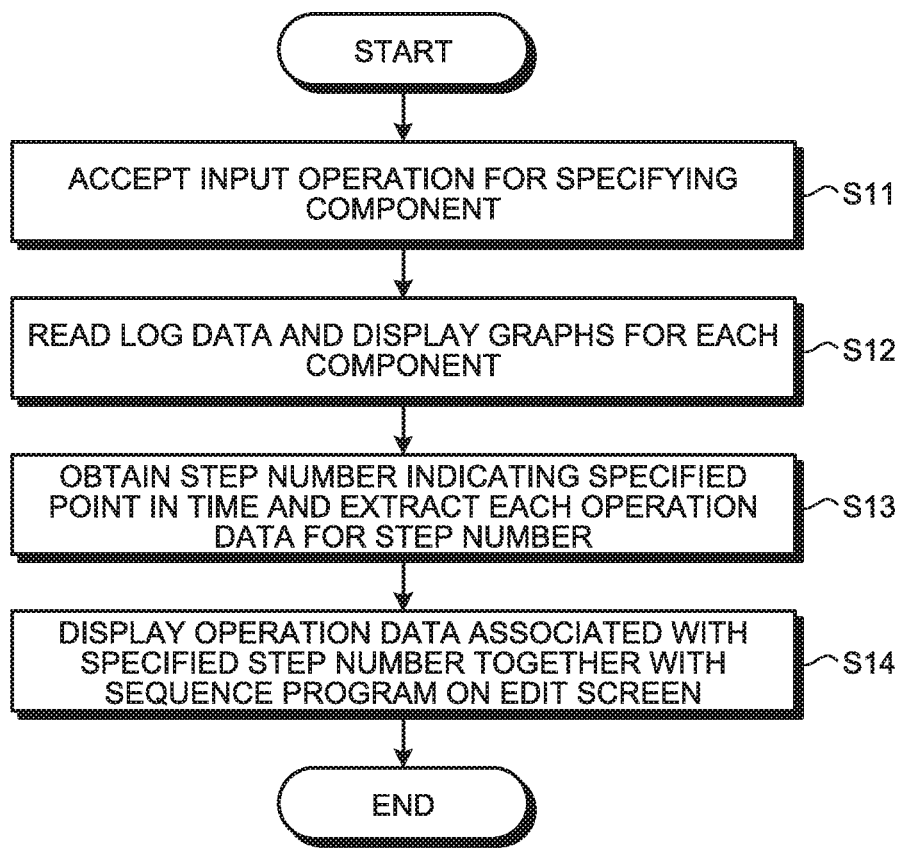
FIG. 7 is a flowchart illustrating a procedure of a debugging process performed by the computer illustrated in FIG. 1.

FIG. 7 is a flowchart illustrating a procedure of a debugging process performed by the computer 2. In performing of the debugging process by the computer 2, the display unit 36 displays an edit screen and a graph display screen which are debugging screens. In the debugging process, the display unit 36 may display an edit screen and a graph display screen in a switching manner, or may simultaneously display an edit screen and a graph display screen.

When the sequence program is executed, a user identifies a component of the ladder program in which an abnormality has occurred, from monitoring results obtained by the monitoring function of the program displaying and editing unit 17. The user specifies the component in which an abnormality has occurred, by an input operation on the computer 2. The graph display processing unit 16 accepts, at step S11, an input operation for specifying a component in which an abnormality has occurred.

According to the input operation at step S11, the graph display processing unit 16 reads, at step S12, log data from the log data storing unit 15. In a presentation processing step, the graph display processing unit 16 displays graphs for each component on a graph display screen, based on the read log data.

Figure 8:
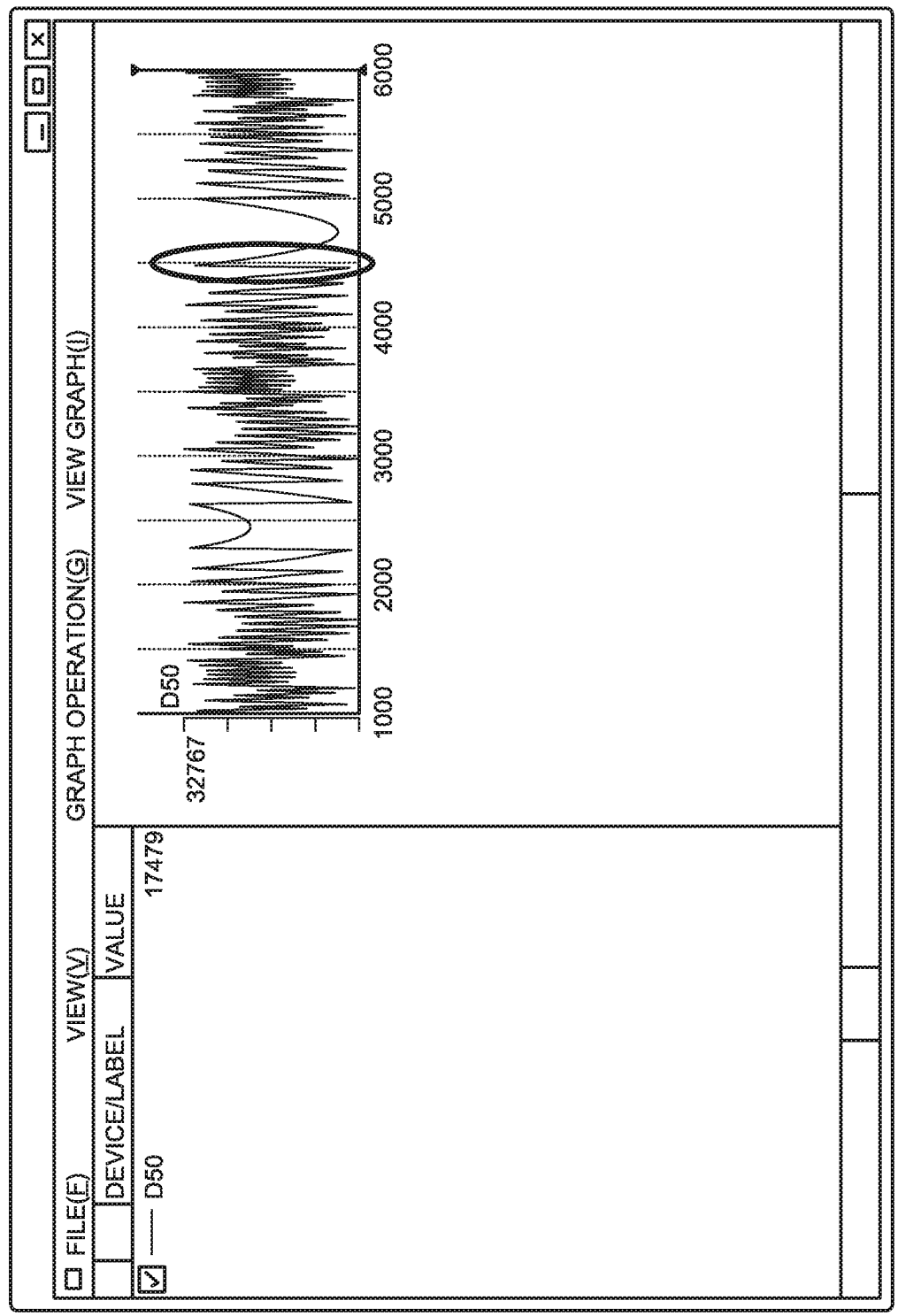
FIG. 8 is a diagram illustrating an example of a graph display screen displayed in a presentation processing step of the first embodiment.

FIG. 8 is a diagram illustrating an example of a graph display screen displayed in the presentation processing step of the first embodiment. Here, it is assumed that an abnormality has been found in "D50" from monitoring results. The user specifies "D50" in which an abnormality has occurred, by an input operation from the input unit 35. The computer 2 reads log data from the PLC 1, and displays a graph for "D50" on a graph display screen which is a debugging screen.

The user identifies, from a graph for the component in which an abnormality has occurred, a point in time which is determined to be when the abnormality has occurred. The user specifies the point in time by a click operation on the graph. The graph display processing unit 16 accepts an operation for specifying the point in time. At step S13, by the operation, the graph display processing unit 16 obtains a step number indicating the specified point in time. In addition, the graph display processing unit 16 extracts each operation data for the step number from the log data.

In the example illustrated in FIG. 8, the user specifies a point in time which is determined to be when an abnormality has occurred, from the graph for "D50" by a click operation using the input unit 35. When it is determined that an abnormality has occurred in a portion enclosed by an ellipse in the graph illustrated in FIG. 8, the user specifies the portion by a click. The graph display processing unit 16 of the computer 2 obtains, from the log data, each operation data for a step number indicating the point in time specified by the user.

The program displaying and editing unit 17 searches the sequence program stored in the program storing unit 11 for a circuit block with the step number obtained by the graph display processing unit 16. At step S14 which is a program display processing step, the program displaying and editing unit 17 displays, on an edit screen, each operation data associated with the step number specified from the graph, together with the sequence program. The program displaying and editing unit 17 displays a circuit block which is a portion of the sequence program corresponding to the obtained step number, and displays each component included in the circuit block, along with its operation data extracted by the graph display processing unit 16. The user performs an edit operation for removing a bug by referring to the circuit block and each operation data which are displayed on the edit screen.

Figure 9:
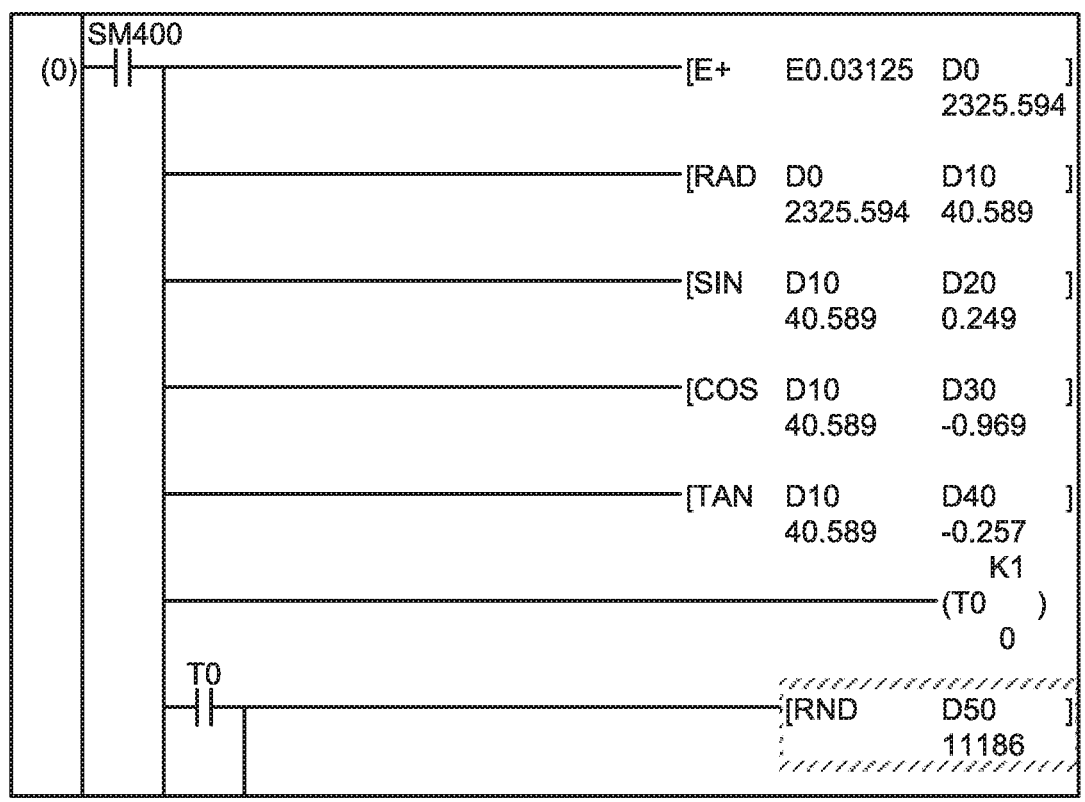
FIG. 9 is a diagram illustrating exemplary display of a sequence program and operation data on an edit screen of the computer illustrated in FIG. 1.

FIG. 9 is a diagram illustrating exemplary display of a sequence program and operation data on an edit screen of the computer 2. On the edit screen which is a debugging screen, a circuit block corresponding to a specified step number is reconstructed. A hatched portion in FIG. 9 indicates an instruction including "D50" in which an abnormality has been found. The computer 2 may give coloring for highlight to a display portion of an instruction including a component in which an abnormality has been found, on the edit screen.

The computer 2 displays, on the edit screen illustrated in FIG. 9, operation data for the specified step number below display of "D0", "D10", "D20", "D30", "D40", "D50", and "T0" of the circuit block. Below "D50" in which an abnormality has been found there is displayed "11186" which is operation data for "D50". The user can check operation data for each component obtained upon the occurrence of an abnormality, on the edit screen. The user performs an edit operation for removing a bug by referring to the circuit block and the operation data for each component which are displayed on the edit screen.

When a specific input operation has been performed from the input unit 35 with an edit screen that includes each operation data being displayed, the computer 2 may switch the display of the edit screen. When the Alt key and the down-arrow cursor key are simultaneously pressed on the keyboard which is part of the input unit 35, the program displaying and editing unit 17 reads, from the log data storing unit 15, each operation data for a step immediately preceding the step for current display. The computer 2 reconstructs a circuit block for the immediately preceding step on the edit screen, and displays the read operation data on the edit screen.

In addition, when the Alt key and the up-arrow cursor key are simultaneously pressed on the keyboard which is part of the input unit 35, the program displaying and editing unit 17 reads, from the log data storing unit 15, each operation data for a step immediately subsequent to the step for current display. The computer 2 reconstructs a circuit block for the immediately subsequent step on the edit screen, and displays the read operation data on the edit screen.

By this, the user can perform an edit operation for removing a bug by referring to operation data for a plurality of steps by simple input operations. The computer 2 may switch the display of the edit screen by any input operation on the input unit 35.

According to the first embodiment, the debugging support apparatus records operation data of each step, and immediately presents operation data for a step number that is specified on a graph. The user can check operation data obtained upon the occurrence of an abnormality together with a sequence program, without separately using a simulation mechanism for abnormality detection. In addition, the user can immediately check a cause of the abnormality by a small number of operations without narrowing down data obtained upon the occurrence of the abnormality. The user can identify a cause of the abnormality from log data with finer granularity, compared to a case where operation data for unit of scan is recorded.

The debugging support apparatus continuously obtains operation data of each step by the recording unit 14. The recording unit 14 obtains not only operation data of input devices and output devices, but also operation data of internal devices that are not directly related to the input devices and the output devices. The debugging support apparatus records continuous log data including also the operation data of the internal devices in addition to the operation data of the input devices and the output devices, instead of fragmentary log data of only the input devices and the output devices. The debugging support apparatus enables to present a relationship between step numbers and operation data, based on log data recorded continuously and with fine granularity. The user can efficiently check operation data obtained at a point in time of the occurrence of an abnormality by referring to the relationship between step numbers and operation data, and can easily identify a bug in the sequence program. By this, the debugging support apparatus enables to reduce man-hours for debugging by easy identification of a bug, and can achieve efficient debugging.

Second Embodiment

Figure 10:
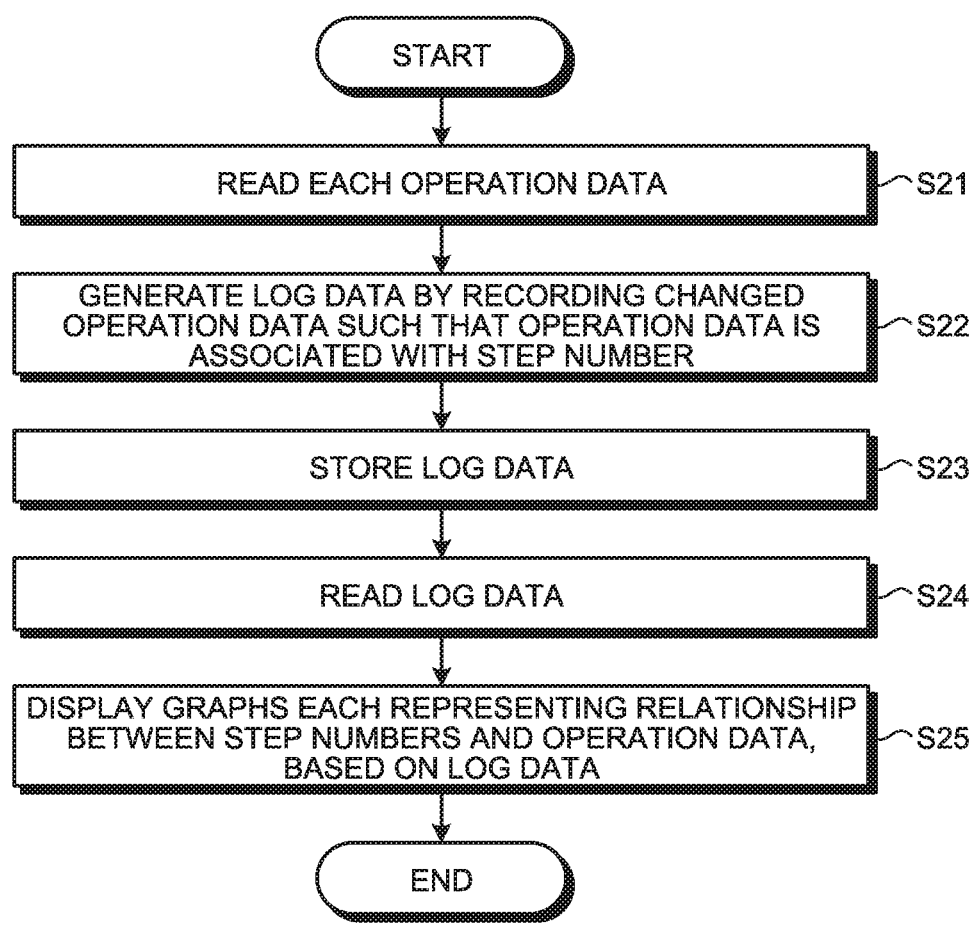
FIG. 10 is a flowchart illustrating a procedure performed by a debugging support apparatus according to a second embodiment of the present invention.

FIG. 10 is a flowchart illustrating a procedure performed by a debugging support apparatus according to a second embodiment of the present invention. The debugging support apparatus of the second embodiment has the same configuration as the debugging support apparatus of the first embodiment.

In the second embodiment, the recording unit 14 of the PLC 1 records operation data obtained when a change has been detected during arithmetic processing by a sequence program. The recording unit 14 omits recording of operation data for which change is not detected during arithmetic processing. The debugging support apparatus of the second embodiment differs from the debugging support apparatus of the first embodiment in that operation data whose change has been detected during performing of the sequence program is recorded and recording of operation data whose change has not been detected is omitted. According to the second embodiment, the debugging support apparatus omits recording of operation data whose change has not been detected, and thereby reduces the number of processes for recording of operation data compared to a case where all operation data is recorded, enabling to reduce the processing load on the PLC 1.

At step S21 illustrated in FIG. 10, the recording unit 14 reads operation data of each step from the data storing unit 13, and monitors a change in a value. When a change in operation data has been detected, at step S22 which is a recording step, the recording unit 14 records the operation data such that the operation data is associated with a step number, and thereby generates log data. At step S23, the log data storing unit 15 stores the log data generated by the recording unit 14.

As an example, when the instruction "E+E0.03125 D0" in the sequence program illustrated in FIG. 4 is executed, the recording unit 14 monitors whether there is a change in operation data for "D0" used in arithmetic processing. When there has been a change in operation data for "D0", the recording unit 14 records the operation data for "D0" together with a step number. Here, it is assumed that as a result of performing each of steps with step number 1000 to 6000, there has been a change in operation data for "D0" for steps with step number 1500 to 3000 and 3500 to 4500, and there has been no change in operation data for "D0" for other steps. The recording unit 14 records the operation data for "D0" for step number 1500 to 3000 and 3500 to 4500, and omits recording of other operation data for "D0". The log data storing unit 15 stores log data in which the operation data for "D0" for step number 1500 to 3000 and 3500 to 4500 is recorded.

At step S24, the graph display processing unit 16 of the computer 2 reads the log data from the log data storing unit 15. At step S25 which is a presentation processing step, the graph display processing unit 16 displays, on a graph display screen, graphs each representing a relationship between step numbers and operation data, based on the read log data.

Figure 11:
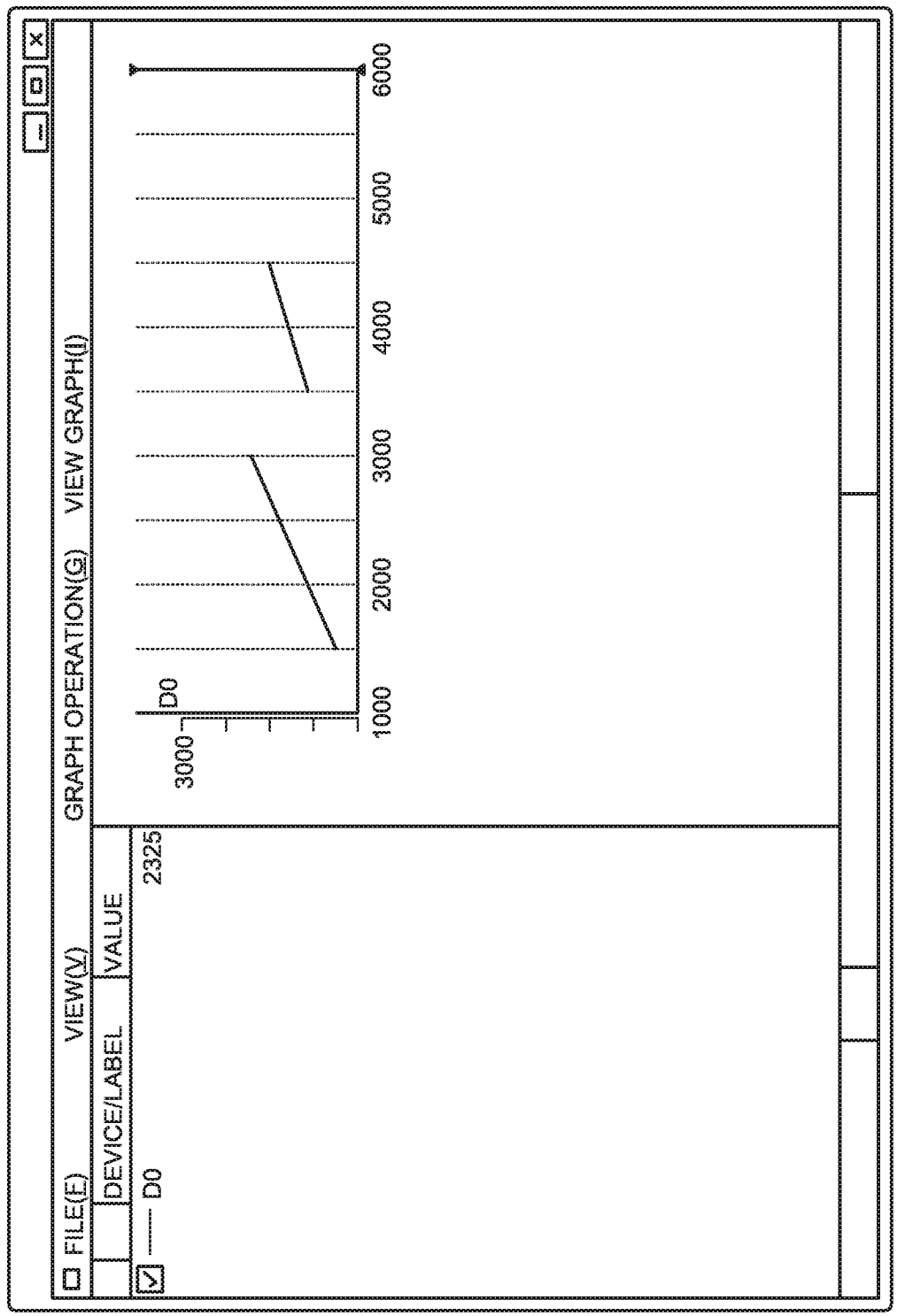
FIG. 11 is a diagram illustrating an example of a graph display screen displayed in a presentation processing step of the second embodiment.

FIG. 11 is a diagram illustrating an example of a graph display screen displayed in the presentation processing step of the second embodiment. Here, it is assumed that an abnormality has been found in "D0" from monitoring results, and graphs for "D0" are displayed on a graph display screen which is a debugging screen.

The graph display processing unit 16 displays graphs for "D0" in a range of step number 1500 to 3000 and 3500 to 4500, based on log data in which operation data for "D0" for step number 1500 to 3000 and 3500 to 4500 is recorded. For a range of other step numbers, because operation data for "D0" is not recorded in the log data, a graph is not displayed. The user identifies, from the displayed graphs, a point in time when it is determined that an abnormality has occurred.

Note that the recording unit 14 may record operation data for a component having operation data whose change has been detected during arithmetic processing, among the components of the sequence program. In this case, the recording unit 14 omits recording of operation data for a component having operation data whose change has not been detected during arithmetic processing.

In this case, the recording unit 14 reads operation data of each step from the data storing unit 13, and monitors a change in operation data. When a change in operation data has been detected, the recording unit 14 sets a component having the changed operation data, as a recording target. At step S22 which is a recording step, the recording unit 14 records operation data for the component which is the recording target such that the operation data is associated with its step number, and thereby generates log data.

According to the second embodiment, the debugging support apparatus records operation data obtained when a change has been detected, or operation data for a component, a change in the operation data of which has been detected. The debugging support apparatus reduces the number of processes performed by the recording unit 14, compared to a case of recording all operation data for arithmetic processing performed as a result of execution of the sequence program. The debugging support apparatus can achieve efficient debugging and reduce the influence on the performance of execution of the sequence program by a process for recording operation data.

Configurations shown in the above-described embodiments show an example of the content of the present invention, and can also be combined with another publicly known technique, and a part of the configurations can also be omitted or changed without departing from the spirit of the present invention.

REFERENCE SIGNS LIST

1 PLC; 2 computer; 3 network cable; 11 program storing unit; 12 program executing unit; 13 data storing unit; 14 recording unit; 15 log data storing unit; 16 graph display processing unit; 17 program displaying and editing unit.

The invention claimed is:

1. A debugging support apparatus that supports debugging of a sequence program, the debugging support apparatus comprising:
   a control apparatus configured to be connected to one or more machines and the control apparatus including a first processor that executes the sequence program;
   a first memory to store a first program which, when executed by the first processor, performs a step of recording log data including step numbers and operation data, the step numbers being order information indicating execution order of arithmetic processing of each step for components constituting the sequence program, and the operation data being data handled in arithmetic processing of each step, the operation data including internal data of the one or more machines;
   a second processor;
   a second memory to store a second program which, when executed by the second processor, performs a step of representing a relationship between the step numbers and the operation data by displaying a graph representing the relationship between the step numbers and the operation data based on the log data; and
   an input device,
   wherein when the input device accepts an operation for specifying a point in time in the graph, the second processor obtains a step number indicating the specified point in time, searches the sequence program for a circuit block that corresponds to a step number that is specified from the graph among a plurality of the circuit blocks that constitute the sequence program, extracts operation data of the circuit block from the log data, displays, on an edit screen, the searched circuit block and the extracted operation data of the circuit block, and performs an editing process for the sequence program.

2. The debugging support apparatus according to claim 1, wherein the first processor records operation data of each step obtained after starting execution of the sequence program.

3. The debugging support apparatus according to claim 1, wherein the first processor records operation data for a component having operation data whose change has been detected during the arithmetic processing, among the components of the sequence program.

4. The debugging support apparatus according to claim 1, wherein the first processor records operation data obtained when a change has been detected during performing of arithmetic processing.

5. The debugging support apparatus according to claim 1, wherein the sequence program includes a ladder program.

6. The debugging support apparatus according to claim 5, wherein the ladder program is written in one of a structured ladder language and a function block diagram language.

7. The debugging support apparatus according to claim 1, wherein the operation data includes data to be inputted to the one or more machines and data to be outputted from the one or more machines.

8. The debugging support apparatus according to claim 1, wherein the first processor executes the sequence program to control the one or more machines.

9. The debugging support apparatus according to claim 1, wherein
the second processor accepts the specified point in time, where an abnormality is determined to be occurred, from an operation on the graph using the input device by a user.

10. A debugging support method for supporting debugging of a sequence program that is executed by a control apparatus configured to be connected to one or more machines, the debugging support method comprising:
recording log data including step numbers and operation data, the step numbers being order information indicating execution order of arithmetic processing of each step for components constituting the sequence program, and the operation data being data handled in arithmetic processing of each step and including internal data of the one or more machines; and
presenting a relationship between the step numbers and the operation data by displaying a graph representing the relationship between the step numbers and the operation data based on the log data, wherein
the presenting further includes, when an operation for specifying a point in time in the graph is accepted, obtaining a step number indicating the specified point in time, searching the sequence program for a circuit block that corresponds to a step number that is specified from the graph among a plurality of the circuit blocks that constitute the sequence program, extracting operation data of the circuit block from the log data, and displaying the searched circuit block and the extracted operation data, and
the debugging support method further includes editing the sequence program.

11. The debugging support apparatus according to claim 10, wherein
the specified point in time, where an abnormality is determined to be occurred, is accepted from an operation on the graph using the input device by a user.

12. A debugging support apparatus that supports debugging of a sequence program, the debugging support apparatus comprising:
a control apparatus configured to be connected to one or more machines and the control apparatus including
an input device,
a processor that executes the sequence program, and
a memory to store a program which, when executed by the processor, performs steps of
recording log data including step numbers and operation data, the step numbers being order information indicating execution order of arithmetic processing of each step for components constituting the sequence program, and the operation data being data handled in arithmetic processing of each step, the operation data including internal data of the one or more machines, and
representing a relationship between the step numbers and the operation data by displaying a graph representing the relationship between the step numbers and the operation data based on the log data,
wherein when the input device accepts an operation for specifying a point in time in the graph, the processor obtains a step number indicating the specified point in time, searches the sequence program for a circuit block that corresponds to a step number that is specified from the graph among a plurality of the circuit blocks that constitute the sequence program, extracts operation data of the circuit block from the log data, and displays, on an edit screen, the searched circuit block and the extracted operation data of the circuit block and performs an editing process for the sequence program.

* * * * *